United States Patent Office 3,298,678
Patented Jan. 17, 1967

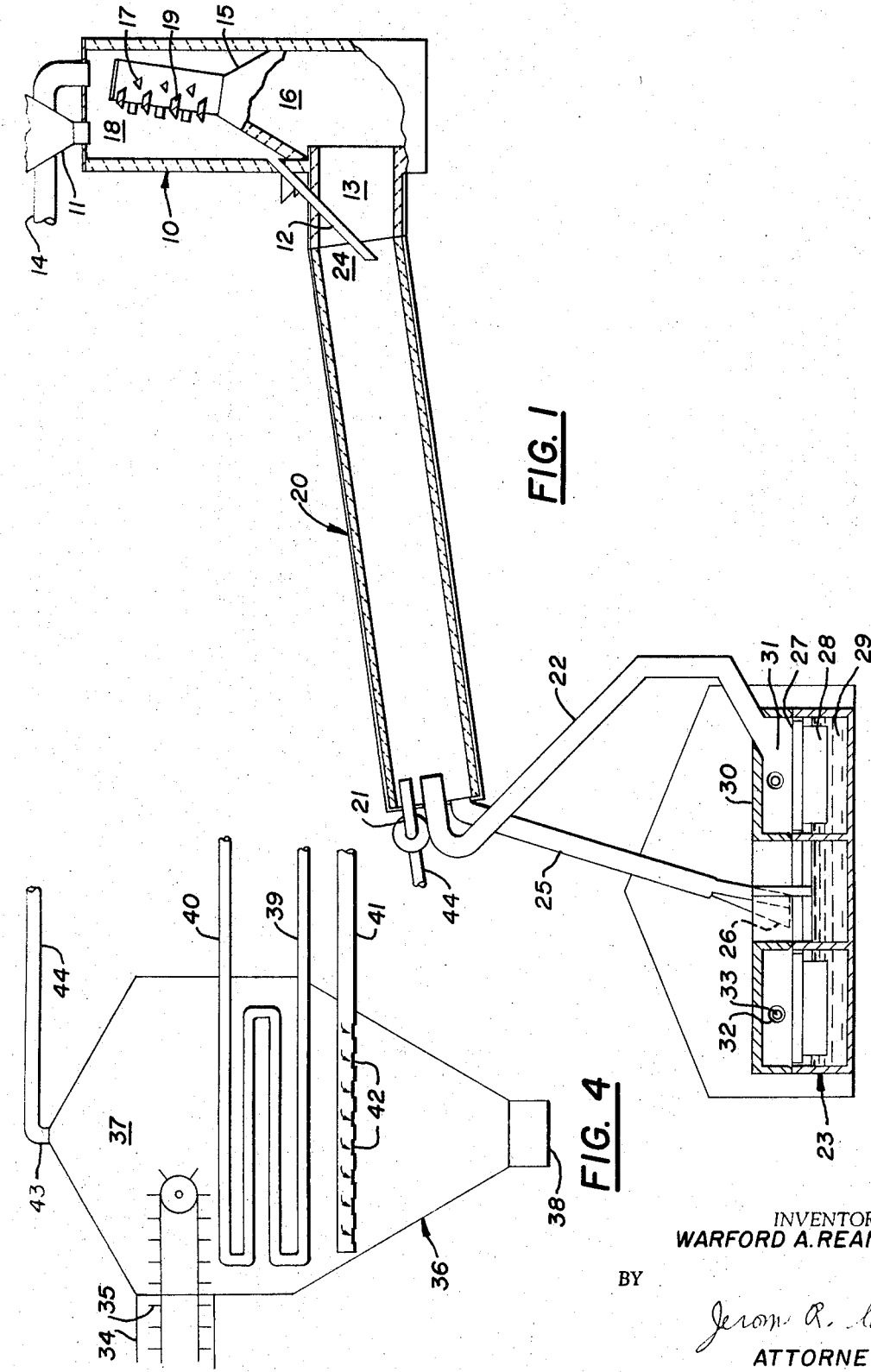

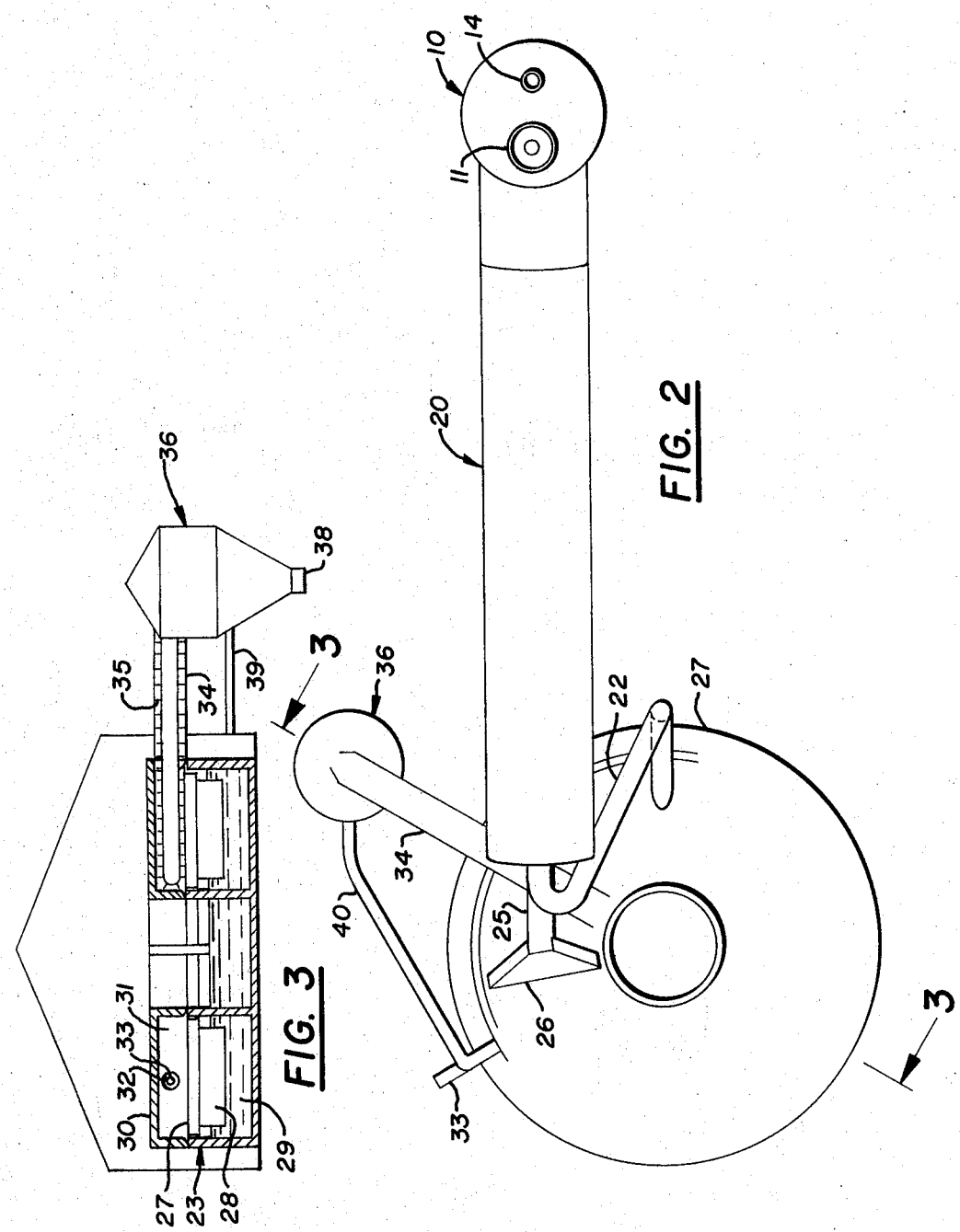

3,298,678
PRODUCTION OF BURNT LIME WITH A ROTARY KILN AND A ROTARY HEARTH
Warford A. Reaney, 264 W. Lincoln Ave., Delaware, Ohio 43015
Filed Sept. 22, 1964, Ser. No. 398,201
12 Claims. (Cl. 263—32)

This invention relates to the calcining of limestone, oyster shells, and other calcareous materials for the production of lime. More particularly, it relates to a process and an apparatus in which the rate of production of lime is significantly increased resulting in a lower unit cost as compared with lime production processes and apparatus now known to the art.

By production of lime by the calcination of limestone and the like is an old and widely practiced art. Lime is used extensively in agriculture and in chemical processing and the methods and equipment used in its production have been the subjects of continuous research for many decades.

Calcining of limestone (which term will be used generically herein to include all calcareous materials calcined to produce lime), usually involves the passing of limestone particles through a rotary kiln in which the particles are tumbled through a stream of combustion gases at a temperature which effectively decomposes calcium carbonate to form calcium oxide and carbon dioxide. Alternatively the particles may be spread in a thin layer on a rotary hearth and passed through a hot zone at a calcination temperature. In either case the critical factors determining the unit cost of the lime are equipment costs, rate of production of lime in a given apparatus, and heat costs.

Objects

It is therefore an object of my invention to provide a process and an apparatus for calcining limestone for the production of lime which process and apparatus reduce the unit cost of the lime produced as compared with processes and apparatus of the art. It is an object to secure this reduction in cost, in part, by substantially increasing the rate of production of lime in a unique combination of known equipment elements; in part, by unique process steps; in part by the use of a novel heat exchanger; and, in part, by a substantial savings in heating costs which savings are inherent in the process and apparatus of the invention.

It is a further object of the invention to remove substantially all sulfur-containing impurities during the calcination process.

The foregoing and related objects are secured in a process for calcining limestone for the production of lime which comprises subjecting limestone particles, at a calcining temperature, to the action of a rotary kiln for a period of time sufficient to effect partial calcination and then subjecting the partially calcined limestone, at a calcining temperature, to the action of a rotary hearth for a period of time sufficient to effect complete calcination.

More particularly, the process of a preferred embodiment of my invention comprises the steps of (1) Preheating limestone particles to a temperature substantially below calcining temperatures as, for example, preheating the limestone to a temperature of about 800°–1000° F.;

(2) Then subjecting the preheated limestone to the action of a rotary kiln for a period of about one hour during which time the limestone reaches a relatively low calcination temperature as, for example, a temperature of about 2000° F.;

(3) Then subjecting the partially calcined limestone to the action of a rotary hearth for a period of about 20–30 minutes wherein said limestone reaches a relatively high calcination temperature as, for example, a temperature of about 2500°–2700° F.; and (4) Then passing the lime produced through a heat exchanger to cool the lime and to heat air utilized to support the combustion of fuel.

Similarly the foregoing and related objects are secured in the furnace illustrated which constitutes an embodiment of the invention and which furnace comprises, in combination:

(1) Means comprising a rotary kiln for the partial calcination of limestone;

(2) Means in series with said kiln and comprising a rotary hearth for the completion of said calcination; and (3) Means for the passage of exhaust combustion gases from said rotary hearth through said kiln in a direction counter current to the flow of said limestone.

More particularly the apparatus of the actual embodiment of the invention illustrated comprises, in combination:

(1) Means comprising a preheater for preheating limestone prior to calcination;

(2) Means in series with said preheater and comprising a rotary kiln for the partial calcination of said preheated limestone;

(3) Means in series with said kiln and comprising a rotary hearth for the completion of said calcination with the resulting formation of lime (the series arrangement of the kiln and the hearth comprising the furnace of the invention);

(4) Means in series with said furnace and comprising a heat exchanger for cooling said lime and heating air for use in the combustion of fuel for said furnace, and especially for the rotary hearth portion thereof; and (5) Means for the passage of exhaust combustion gases from said rotary heater through said kiln and then through said preheater in a direction counter current to the flow of said limestone.

In essence the invention involves treating limestone in serial fashion in known calcination devices—a rotary kiln and a rotary hearth or, alternatively, a preheater, a rotary kiln, a rotary hearth and a heat exchanger. The advantages to be gained thereby, however, have proved to be very surprising. I have found, for example, that limestone can be calcined several times faster in accordance with the principles of my invention as compared to calcining either in a rotary kiln alone or in a rotary hearth alone.

Thus, by way of example, one can compare the operation of a 150 ton capacity rotary kiln and a 150 ton capacity rotary hearth operating separately, as in prior art practice, and operating in series, as in the present invention.

In prior practice the feed rate of limestone to the kiln of the example would be 300 tons per day with a production of lime of 150 tons per day, the flow rate of limestone through the kiln being about one foot per minute. Similarly, in prior practice the feed rate of limestone to the rotary hearth of the invention would be 300 tons per day with a production of lime of 150 tons per day, the hearth making one revolution every 90 minutes. According to the invention the feed rate to the kiln is increased 3-fold and the rate of movement of limestone through the kiln is increased 3-fold. Similarly, the rate of rotation of the rotary hearth is increased 3-fold. Thus, to follow the example 900 tons of limestone per day is fed to the kiln and the limestone moves through the kiln at about 3 feet per minute, and (e.g., at 30% ignition loss) yields 630 tons of partially calcined limestone. This latter product is passed to a rotary hearth and, with a rate of rotation of the hearth of one rotation per 30 minutes, produces about 450 tons of lime per day.

Thus, a kiln with a daily lime capacity of 150 tons and a rotary hearth with a daily lime capacity of 150 tons per day, if combined according to the principles of the invention, will produce 450 tons of lime per day—an increase of 50% with the same equipment and, as will appear hereinafter, with less heat.

I am not completely sure of the explanation for this surprising result but I believe the relatively low temperature partial calcination, particularly following a preheating step, produces a type of porous or open structure in the partially calcined limestone which is uniquely adaptable to complete and rapid calcination on a rotary hearth. This advantage is accentuated by the fact that despite the more rapid calcination, sulfur is substantially completely removed from the lime in the process of my invention.

As indicated above, the furnace of the invention uses less heat to produce more lime. This advantage flows from the fact that operating a kiln and hearth in series permits of the passage of exhaust heat from the hearth through the kiln. Thus, the combination in series of a rotary kiln and a rotary hearth does not require as much heat as operation of the two separately and yet, to follow the foregoing example, a 50% increase in production can be effected by such a combination.

The savings in heat referred to can be supplemented by a novel heat exchanger which can be placed in series with the furnace of the invention to cool the lime and to heat air used in the combustion of fuel for the furnace. The novel heat exchanger includes means for both direct and indirect heat exchange and comprises (1) A vessel adapted for the passage of hot lime therethrough;

(2) Means for said indirect heat exchange comprising a closed conduit adapted to be imbedded in said lime and adapted to provide thermal contact between said lime and air circulating in said conduit; and (3) Means for said direct heat exchange comprising a second conduit extending into said vessel and being provided with a plurality of holes therein, wherein said holes permit the passage of air from said conduit into the body of said lime for direct contact therewith.

The hot air from both the direct and indirect heat exchange can be used to support the combustion of fuel in both the hearth and the kiln although I prefer to isolate the directly heated air from the hearth, to use the indirectly heated air to support combustion in the hearth and to use the directly heated air to support combustion in the kiln.

The invention can be better understood by reference to the accompanying drawings which illustrate an embodiment of the invention.

In the drawings:

FIG. 1 is a diagrammatic elevation view, partly in section, of an illustrative apparatus suitable for the carrying out of the invention;

FIG. 2 is a diagrammatic plan view of the apparatus of FIG. 1;

FIG. 3 is a diagrammatic view in cross section taken along the line 3—3 of FIG. 2; and FIG. 4 is a diagrammatic elevation view of a novel heat exchanger of particular value in the apparatus of the invention.

Referring more particularly to the drawings, a preheater 10 is provided with a hopper 11 to receive limestone being fed to the calcining apparatus, a conduit 12 for limestone leaving the preheater, an inlet port 13 for entry of hot combustion gases, and an exit port 14 for exhaust gases. A chimney 15 constructed inside the preheater 10 has an inner duct 16 for the passage of hot gases upward through the chimney to a plurality of holes 17 formed in the chimney for the escape of hot gases outward from the chimney into the limestone containing chamber 18. Outwardly projecting hoods 19 of angle iron or the like prevent limestone from entering the inner duct 16 of the chimney 15. A preheater of this type is described in detail and claimed in a copending application of Warford A. Reaney et al., Serial No. 163,383, filed December 26, 1961, now U.S. Patent No. 3,159,386. However, as will be evident to those skilled in the art, other suitable preheaters may be used to accomplish the objectives of the invention and a substantial portion of the objects of my invention may be accomplished even without a preheater.

A rotary kiln 20 is positioned to receive preheated lime via conduit 12. The rotary kiln 20 can be any of the types commonly used in the calcining art. As shown, the rotary kiln 20 is provided with a burner 21 for the combustion of fuel, a conduit 22 for receiving exhaust gases from a rotary hearth 23, and an exit port 24 for hot gases, which port 24 leads, as shown, into the gas inlet port 13 of the preheater 10. The rotary kiln 20 is also provided with an exit conduit 25 for conducting partially calcined limestone to the rotary hearth 23. The exit conduit 25 for partially calcined limestone is widened at its bottom end 26 in order to provide for spreading the limestone in a thin layer as it is delivered to the rotary hearth 23.

The rotary hearth 23 can be any of the types used in the calcination of limestone but I prefer a "floating" hearth of the type described and claimed in a copending application Serial No. 378,656, filed June 29, 1964, by David Reaney.

The rotary hearth 23, as shown, is provided with a rotatable annular hearth 27 supported on pontoons 28 which float on a pool of water or other liquid 29. A stationary hood 30 constructed above the hearth 27 cooperates with the hearth 27 to form the main heating zone 31 of the furnace. The hood 30 is provided with one or more inlet ports such as the inlet port 32 for incoming burning gases. Preferably one or more burners such as 33 provide such burning gases. Any suitable means may be provided for removing the calcined lime from the rotatable hearth. For instance, a conduit 34 and a drag line 35 is illustrated, the latter being provided to scrape the lime from the hearth 27.

A heat exchanger 36 (see FIGS. 3 and 4), positioned to receive the calcined lime product from the conduit 34 is provided with an inner chamber 37 for hot lime and an exit port 38 for the cooled lime. A coil 39 permits of the passage of air through the bed of hot lime. The resulting hot air passes via conduit 40 to burners such as 33 to support the combustion of fuel to supply the rotary hearth 23 with burning gases via port 32 and to provide heat for the rotary hearth.

Although many types of heat exchangers will be found suitable in the apparatus of the invention, I prefer to use a novel heat exchanger which provides both direct and indirect heat exchange between air and the hot lime. A specific embodiment of such a heat exchanger is diagrammatically shown in FIGURE 4 wherein the heat exchanger 36 is provided with an inner chamber 37 for hot lime entering the heat exxchanger through a conduit 34, being fed thereto by a drag line 35. The heat exchange vessel 36 is also provided with an exit port 38 for the cooled lime. A coil 39 permits of the passage of air through the bed of hot lime without direct contact with the lime but with thermal contact between the air and lime. The indirectly heated air is then passed through a conduit 40 to the burner 33 (see FIGURE 2) of the rotary hearth 27.

The heat exchanger 36, as illustrated in FIGURE 4, is also provided with a conduit 41 extending into the heat exchanger, the conduit 41 being provided with a plurality of air holes such as the holes 42. These holes are preferably limited to the underside of the conduit 41 in order to prevent lime from entering the conduit 41. Air entering the conduit 41 and leaving by the holes 42, as indicated by the small arrows, pass through the hot lime and exit via port 43. This latter air is preferably passed through a pipe 44 to the burner 21 of the kiln 20 (see FIGURE 1) to support the combustion of fuel in said kiln.

Operation

Crushed limestone is introduced into the apparatus via the hopper 11 of the preheater 10. As the limestone descends toward the conduit 12 it is contacted by hot gas from the rotary kiln 20 which gas rises in the inner duct 16 of the chimney 15 leaving the chimney via holes 17. In this manner, the limestone is preheated prior to its entrance into the rotary kiln 20. It is desirable to use as much of the exhaust heat from the rotary kiln 20 as possible while avoiding any significant degree of calcination. Thus I prefer to preheat the limestone to a temperature substantially below 1800° F., preferably to a temperature of about 800°–1000° F.

The preheated limestone passes through conduit 12 into the rotary kiln 20 where it is tumbled through a stream of hot combustion gases in the manner well known in the art. An important step in the process of my invention, however, involves the degree of calcination permitted in the rotary kiln 20. Thus I speed the movement of limestone through the rotary kiln 20, preferably, about two or three times its normal speed according to prior practices, thus providing, preferably, about one hour contact with the hot combustion gases instead of the normal three hour contact. During a period of about one hour the limestone does not reach complete calcining temperatures but rather reaches a temperature of about 2000° F. Calcination in the kiln takes place at about 1800°–2000° F. This procedure effects a partial calcination of the limestone in the rotary kiln.

The partially calcined limestone is passed from the rotary kiln 20 via the conduit 25 to the rotary hearth 23. The conduit 25 is widened at its bottom end 26 in order to distribute the limestone evenly and in a thin layer on the rotating hearth 27. The limestone is then rotated while on the hearth 27 (counterclockwise, as shown in FIG. 2) into the heating zone 31 under the hood 30 where calcination is completed preferably at a temperature of about 2200°–2700° F. or, if the substantially complete removal of sulfur is desired, at a temperature of about 2500°–2700° F. When hearth temperatures of 2500°–27000° F. are used, complete calcination on the hearth takes about 20–30 minutes. When the hearth has made a complete cycle the calcined lime product is removed by the drag line 35 into conduit 34 and then into the heat exchanger 36 where the lime is cooled and incoming air is heated. The heated air is then conducted to the rotary hearth and the rotary kiln for use in supporting combustion. As indicated I prefer to use the hot air from indirect exchange with lime for supporting combustion in burner 33 and use the hot air from direct exchange in burner 21.

The burner 33 combines fuel with preheated air from conduit 40 and blows the resulting burning combustion gases into the heating zone 31 of the rotary hearth 23. These hot gases are exhausted via conduit 22 and enter rotary kiln 20 where they are supplemented by the auxiliary burner 21 and auxiliary air from direct heat exchange via conduit 44. The hot gases from the rotary kiln are exhausted via port 24 to enter port 13 of the preheater. In this manner the process of the invention not only increases the rate of production of lime but permits, because of the serial use of the combustion gases, of a considerable savings in heating costs.

As indicated previously the process of the invention yields a surprisingly high production rate. It appears paradoxical that the partial calcination in the rotary kiln would ultimately result in a saving of the overall time of calcination. This, however, is believed to result from the initial formation of a uniquely porous structure which is then more efficiently calcined on the rotary hearth.

It is to be understood that the detailed drawings and specific examples given describe preferred embodiments of my inventions and are for purposes of illustration only, that the apparatus and method of the invention are not limited to the precise details and precise conditions disclosed, and that various changes may be made therein without departing from the spirit of the invention which is defined by the following claims.

I claim:
1. A process for calcining limestone which comprises the steps of
   subjecting limestone particles, at a calcining temperature, to the action of a rotary kiln for a period of time sufficient to effect partial calcination, and
   then subjecting the partially calcined limestone, at a calcining temperature, to the action of a rotary hearth for a period of time sufficient to effect complete calcination,
wherein the limestone particles are subjected to the action of the rotary kiln for a period of about one hour and attain a temperature of about 2000° F.

2. A process for calcining limestone which comprises the steps of
   subjecting limestone particles, at a calcining temperature, to the action of a rotary kiln for a period of time sufficient to effect partial calcination, and
   then subjecting the partially calcined limestone, at a calcining temperature, to the action of a rotary hearth for a period of time sufficient to effect complete calcination,
wherein the calcination on the rotary hearth is carried out at a temperature of about 2500° to 2700° F.

3. A process for calcining limestone which comprises the steps of
   subjecting limestone particles, at a calcining temperature, to the action of a rotary kiln for a period of time sufficient to effect partial calcination, and
   then subjecting the partially calcined limestone, at a calcining temperature, to the action of a rotary hearth for a period of time sufficient to effect complete calcination,
wherein the limestone particles are subjected to the action of the rotary kiln for a period of about one hour and attain a temperature of about 2000° F. and wherein the calcination on the rotary hearth is carried out at a hearth temperature of about 2500° to 2700° F.

4. A process for calcining limestone which comprises the steps of
   preheating limestone particles to a temperature substantially below about 1800° F.;
   then subjecting the preheating limestone, at a calcining temperature, to the action of a rotary kiln for a period of time sufficient to effect partial calcination;
   then subjecting the partially calcined limestone, at a calcining temperature, to the action of a rotary hearth for a period of time sufficient to effect complete calcination,
wherein the limestone particles are subjected to the action of the rotary kiln for a period of about one hour and attain a temperature of about 2000° F.

5. A process for calcining limestone which comprises the steps of
   preheating limestone particles to a temperature substantially below about 1800° F.;
   then subjecting the preheated limestone, at a calcining temperature, to the action of a rotary kiln for a period of time sufficient to effect partial calcination;
   then subjecting the partially calcined limestone, at a calcining temperature, to the action of a rotary hearth for a period of time sufficient to effect complete calcination,
wherein the calcination on the rotary hearth is carried out at a temperature of about 2500° to 2700° F.

6. A process for calcining limestone which comprises the steps of
   preheating limestone particles to a temperature substantially below about 1800° F.;
   then subjecting the preheated limestone, at a calcining temperature, to the action of a rotary kiln for a period of time sufficient to effect partial calcination;
then subjecting the partially calcined limestone, at a calcining temperature, to the action of a rotary hearth for a period of time sufficient to effect complete calcination,
wherein the limestone particles are subjected to the action of the rotary kiln for a period of about one hour and attain a temperature of about 2000° F. and wherein the calcination on the rotary hearth is carried out at a temperature of about 2500° to 2700° F.

7. A process for calcining limestone which comprises the steps of
preheating limestone particles to a temperature substantially below about 1800° F.;
then subjecting the preheated limestone, at a calcining temperature, to the action of a rotary kiln for a period of time sufficient to effect partial calcination;
then subjecting the partially calcined limestone, at a calcining temperature, to the action of a rotary hearth for a period of time sufficient to effect complete calcination;
and wherein the said preheating temperature in the preheating step and the said calcining temperature in the partial calcining step are maintained at least in part by exhaust combustion gases from said rotary hearth.

8. A process for calcining limestone which comprises the steps of
preheating limestone particles to a temperature substantially below about 1800° F.;
then subjecting the preheated limestone to the action of a rotary kiln at a calcining temperature for a period of about one hour to effect partial calcination;
then subjecting the partially calcined limestone to the action of a rotary hearth at a temperature of about 2500° to 2700° F. for about 30 minutes;
then passing the lime produced through a heat exchanger to cool the lime and to heat air to be utilized to support the combustion of fuel for said process.

9. A process for calcining limestone which comprises the steps of
preheating limestone particles to a temperature of about 800° to 1000° F.;
then subjecting the preheated limestone to the action of a rotary kiln at a calcining temperature for a period of about one hour to effect partial calcination;
then subjecting the partially calcined limestone to the action of a rotray hearth at a temperature of about 2500° to 2700° F. for about 30 minutes;
then passing the lime produced through a heat exchanger to cool the lime and to heat air to be utilized to support the combustion of fuel for said process;
and wherein the said preheating temperature in the preheating step and the calcining temperature in the partial calcining step are maintained at least in part by exhaust combustion gases from said rotary hearth.

10. An apparatus for the calcination of limestone which comprises, in combination,
means comprising a preheater for preheating limestone prior to calcination,
means in series with said preheater and comprising a rotary kiln for the partial calcination of said preheated limstone,
means in series with said kiln and comprising a rotary calcining hearth for the completion of said calcination with the resulting formation of lime,
means in series with said rotary hearth and comprising a heat exchanger for cooling said lime and heating air for use in the combustion of fuel for said rotary hearth, and
means for the passage of exhaust combustion gases from said rotary hearth through said kiln and then through said preheater in a direction countercurrent to the flow of said limestone.

11. An apparatus for the calcination of limestone which comprises, in combination,
means comprising a rotary kiln for the partial calcination of limestone;
means in series with said kiln and comprising a rotary hearth for the completion of said calcination and the resulting production of hot lime;
a heat exchange in series with said hearth for the direct and indirect exchange of heat between said hot lime and air for use in the combustion of fuel which heat exchanger comprises a vessel for the passage of hot lime therethrough, means for said indirect heat exchange comprising a closed conduit adapted to be imbedded in said lime and adapted to provide thermal contact between said lime and air circulating in said conduit, and means for said direct heat exchange comprising a second conduit extending into said vessel and being provided with a plurality of holes therein, wherein said holes permit the passage of air from said second conduit into the body of said lime for direct contact therewith; and
means for the passage of exhaust combustion gases from said rotary hearth through said kiln in a direction counter-current to the flow of said limestone.

12. An apparatus for the calcination of limestone which comprises, in combination,
means comprising a preheater for preheating limestone prior to calcination;
means in series with said preheater and comprising a rotary kiln for the partial calcination of said preheated limestone;
means in series with said kiln and comprising a rotary hearth for the completion of said calcination with the resulting formation of hot lime;
means in series with said rotary hearth and comprising a heat exchanger for the direct and indirect exchange of heat between said hot lime and air for use in the combustion of fuel for said kiln and said hearth, respectively; said heat exchanger comprising a vessel adapted for the passage of hot lime therethrough, means for said indirect heat exchange comprising a closed conduit adapted to be imbedded in said lime and adapted to provide thermal contact between said lime and air circulating in said conduit, and means for said direct heat exchange comprising a second conduit extending into said vessel, said second conduit being provided with a plurality of holes therein and wherein said holes permit the passage of air from said second conduit into the body of said lime for direct contact therewith; and
means for the passage of exhaust combustion gases from said rotary hearth through said kiln and then through said preheater in a direction countercurrent to the flow of said limestone.

References Cited by the Examiner

UNITED STATES PATENTS

| | | | |
|---|---|---|---|
| 1,496,094 | 6/1924 | Moetteli | 263—32 X |
| 2,409,707 | 10/1946 | Roetheli | 262—53 X |
| 3,199,850 | 8/1965 | Lee | 263—32 |

FOREIGN PATENTS 1,164,917  3/1964  Germany.

DONLEY J. STOCKING, *Primary Examiner.*

JOHN J. CAMBY, FREDERICK L. MATTESON, JR.,
*Examiners.*